Oct. 28, 1941.  W. L. CHILDS  2,260,366
REAMER
Filed March 12, 1940
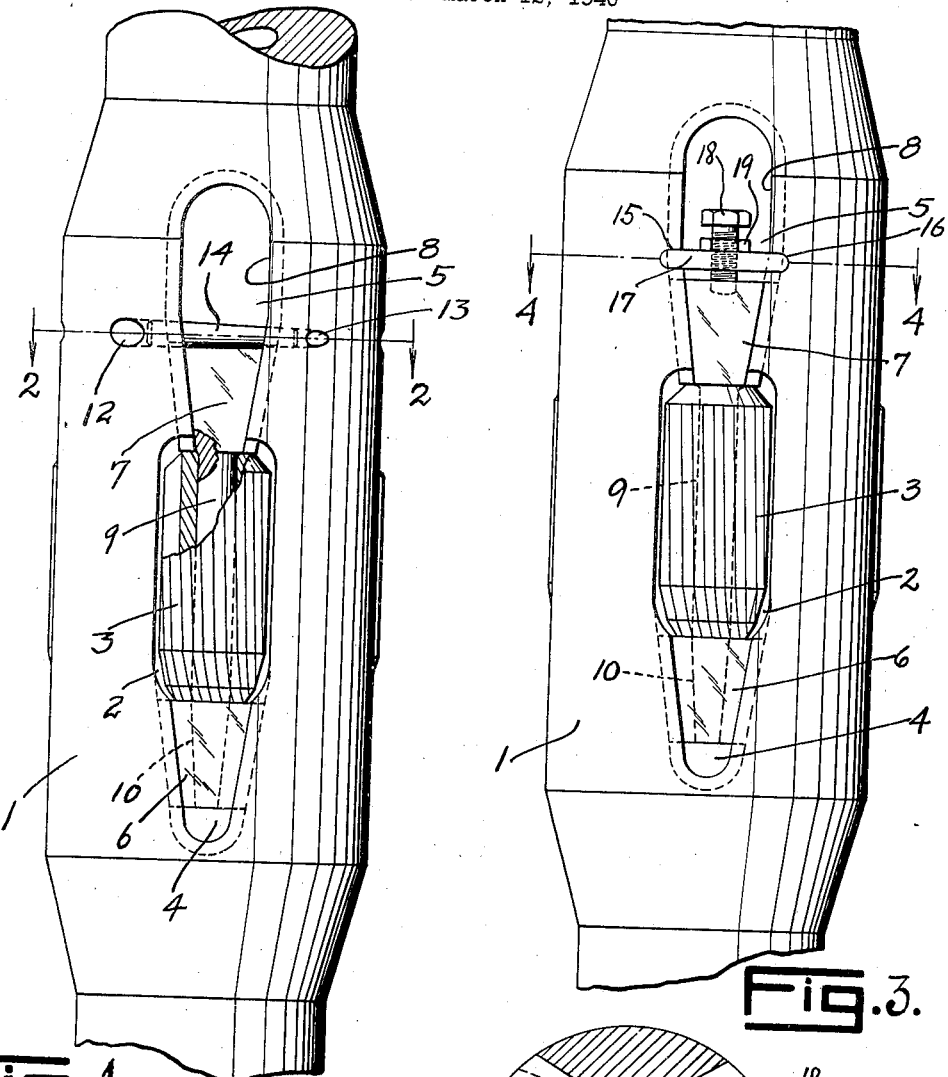
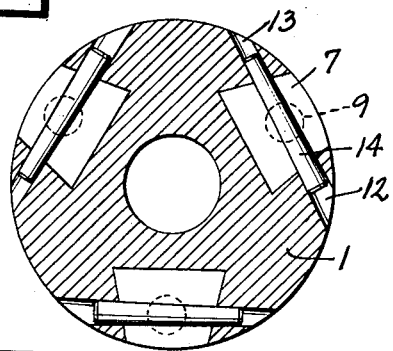
W. L. Childs.
INVENTOR.
BY
ATTORNEYS Patented Oct. 28, 1941

2,260,366

UNITED STATES PATENT OFFICE 2,260,366

REAMER

William L. Childs, Houston, Tex., assignor to Reed Roller Bit Company, Houston, Tex., a corporation of Texas Application March 12, 1940, Serial No. 323,497

2 Claims. (Cl. 255—73)

This invention relates to reamers for use in the drilling of wells. It has for its general object the provision of a structure by which a reamer cutter of the roller type may be firmly and securely mounted in a reamer body.

It is a most specific object of this invention to provide a structure for mounting a reamer cutter in a recess in the side of a reamer body in such a manner to give it the greatest possible degree of rigidity, prevent any play or lost motion between the parts during operation, and provided a structure by which the cutter may be readily mounted or dismounted without special tools and without the necessity for any special skill.

Other objects and advantages will become apparent from the following description taken in connection with the accompanying drawing, it being understood that same are by way of illustration and example only.

In the drawing:

Fig. 1 is a side elevation of a reamer body constructed in accordance with this invention, showing the reamer cutters in place therein.

Fig. 2 is a horizontal cross section taken along the line 2—2 of Fig. 1.

Fig. 3 is a view similar to Fig. 1 showing a slight modification.

Fig. 4 is a view similar to Fig. 2 taken along the line 4—4 of Fig. 3.

In accordance with this invention, a reamer body 1 is provided with a major recess 2 therein adapted to receive a reamer cutter 3, and with a minor recess 4 at one end thereof and a second minor recess 5 at the opposite end thereof adapted to receive respectively supporting blocks 6 and 7 for supporting the reamer cutter. The recesses 4 and 5 both taper in the same direction with respect to the body 1. That is, the recess 4 tapers to a smaller dimension in a direction away from the major recess 2, whereas the auxiliary recess 5 at the opposite end of the major recess tapers to a smaller dimension toward the major recess 2. Both of these auxiliary recesses 4 and 5 taper to the outer contour of the reamer body. That is to say, they are each narrower at the outer contour of the reamer body than at the bottoms of the respective recesses. The blocks 6 and 7 are correspondingly shaped and tapered so that when either of the blocks 6 and 7 is forced downwardly as seen in Fig. 1 and Fig. 4, it will tend to wedge tightly between the sides of this recess and to be drawn in toward the center of the reamer body. The tail of the auxiliary recess 5, or that end most remote from the major recess is made of greater width than the remainder of this auxiliary recess as indicated at 8.

Integral with the block 7 is a shaft 9 which extends through and serves to rotatably support the cutter 3. At its lower end, this shaft 9 is tapered as shown at 10 to fit within a corresponding opening in the block 6.

The body 1 is provided with a pair of aligned openings 12 and 13 on opposite sides of and intersecting the auxiliary recess 5, these openings being adapted to receive a tapered pin 14.

It will readily be seen that the device just described may be assembled by placing the block 6 in the recess 4. The cutter member 3 is slipped over the shaft 9 of the unit comprising the block 7 and the shaft 9, whereupon the cutter 3 and the said unit are secured in their respective recesses as follows. In inserting the block 7 in its recess, the outer end of the block is first inserted in the recess with the tapered faces of the block facing upwardly and downwardly along the axis of the body 1 and with the shaft or pin 9 projecting outwardly at substantially right angles to the body 1. The block 7 with its larger end on the bottom of the recess 5 is then turned substantially about the axis of the pin or shaft 9 until the outer surface of the block 7 faces upwardly and the inner surface downwardly along the axis of the body 1. The pin or shaft 9 is then swung downwardly until the smaller end of the block 7 lies within the recess after which the entire assembly will be moved downwardly to the position shown in the drawing. The cutter 3, being mounted on the shaft 9, will be moved into the recess 2 as the shaft 9 swings downwardly into the said recess, the shaft coming to a rest in the tapered opening provided in the block 6. After these parts are in place they may be securely held in place and urged into their proper locked position by means of the tapered pin 14. This pin 14 as it is forced into place from left to right as seen in Fig. 1 will have a wedging action on the block 7, and acting through this block and the shaft 9 will force the block 6 downwardly to wedge it into place. The cutter will thus be securely mounted and ready for use.

On the other hand, the cutter may be readily dismounted by merely knocking out the pin 14 and removing the blocks 6 and 7 and the cutter 3.

Referring to Figures 3 and 4, the form here illustrated is identical with that illustrated in Figures 1 and 2 with the exception that instead of the openings 12 and 13 and the key or tapered pin 14, the body in Figures 3 and 4 is provided with notches 15 and 16 on opposite sides of the recess 5 just above the upper end of the block 7 when the same is in place, and these notches are adapted to receive a key or abutment 17 which slides into place in a substantially radial direction. This abutment 17 has a set screw 18 threadedly mounted therein and this set screw is provided with a lock nut 19. It will readily be seen that the set screw 18 may be tightened against the block 7 for the purpose of forcing this block, the shaft 9, and the block 6 downwardly to secure the same in place as previously described. The set screw may be held in such locked position by means of the lock nut 19.

In removing the cutter 3 from the body in the form illustrated in Figures 3 and 4 the procedure is the same as described in connection with Figures 1 and 2 with the exception that instead of knocking out the pin 14, the lock nut 19 and set screw 18 are first loosened and then the key 17 is removed to permit the other parts to be taken out.

From the foregoing it will be seen that means have been provided for carrying out all of the objects and advantages sought by this invention, including the provision of a device which is extremely simple and easy to manipulate at the same time providing for the rigid mounting of a cutter without any substantial possibility of its becoming accidentally removed or released.

It is noteworthy that in each of the forms set forth there is provided a structure which makes possible the changing of cutters at the scene where the work is being done, thus greatly reducing the necessary cost of transportation and the delays involved thereby as compared with structures in which the entire reamer must be transported to the factory whenever the cutters become worn.

Having described my invention, I claim:

1. In a reamer construction, a reamer body having a major recess in its outer surface and a smaller auxiliary recess at each end of said major recess, each of said auxiliary recesses being tapered in the same direction longitudinally with respect to said body, and a correspondingly tapered block in each of said auxiliary recesses, a reamer cutter shaft extending between said blocks and through said major recess, a cutter rotatably carried by said shaft within said major recess, said body having aligned openings on opposite sides of one of said auxiliary recesses adjacent the end of the block therein, and a tapered pin engaging said openings and said block to urge both blocks in a direction to cause them to tightly engage said auxiliary recesses.

2. In a reamer construction, a reamer body having a major recess in its outer surface and a smaller auxiliary recess at each end of said major recess, each of said auxiliary recesses being tapered in the same direction longitudinally with respect to said body, and a correspondingly tapered block in each of said auxiliary recesses, a reamer cutter shaft extending between said blocks and through said major recess, and a cutter rotatably carried by said shaft within said major recess, said body having a pair of openings on the opposite sides of one of said auxiliary recesses adjacent the end of the block therein, an abutment having its extremities carried in said openings and extending across said auxiliary recess, and a set screw carried by said abutment and adapted to engage said adjacent block to force both blocks in a longitudinal direction to cause them to tightly engage said auxiliary recesses.

WILLIAM L. CHILDS.